May 16, 1933.   W. F. PETTIE   1,909,222
PHOTOGRAPHIC CAMERA
Filed May 11, 1929   2 Sheets-Sheet 1
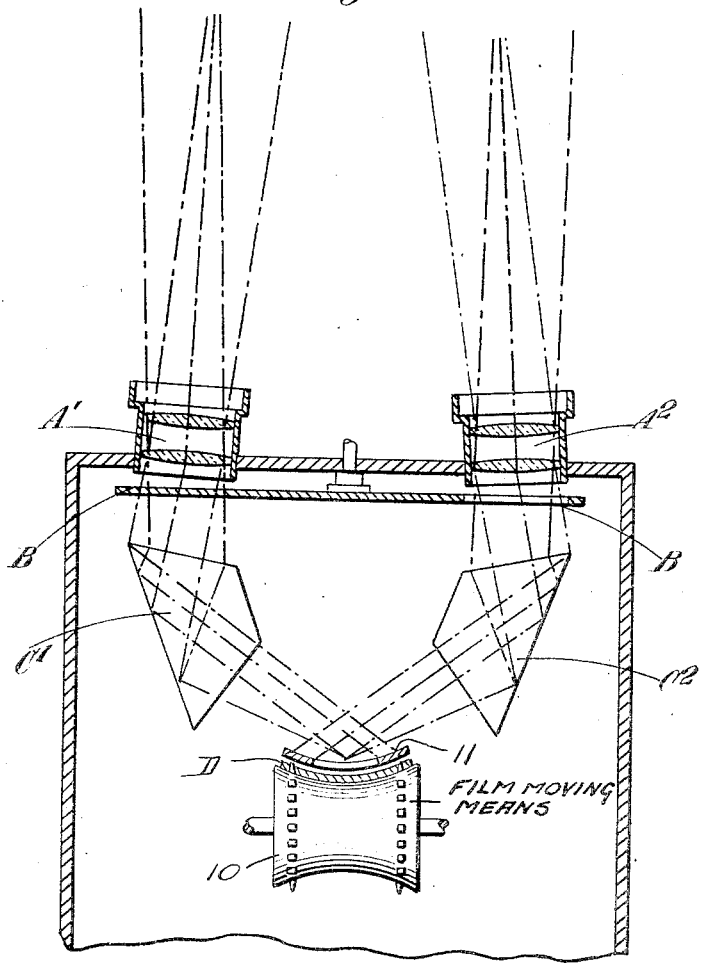
Inventor
William F. Pettie
by Wilkinson & Shasta
Attorneys May 16, 1933.  W. F. PETTIE  1,909,222
PHOTOGRAPHIC CAMERA
Filed May 11, 1929   2 Sheets-Sheet 2
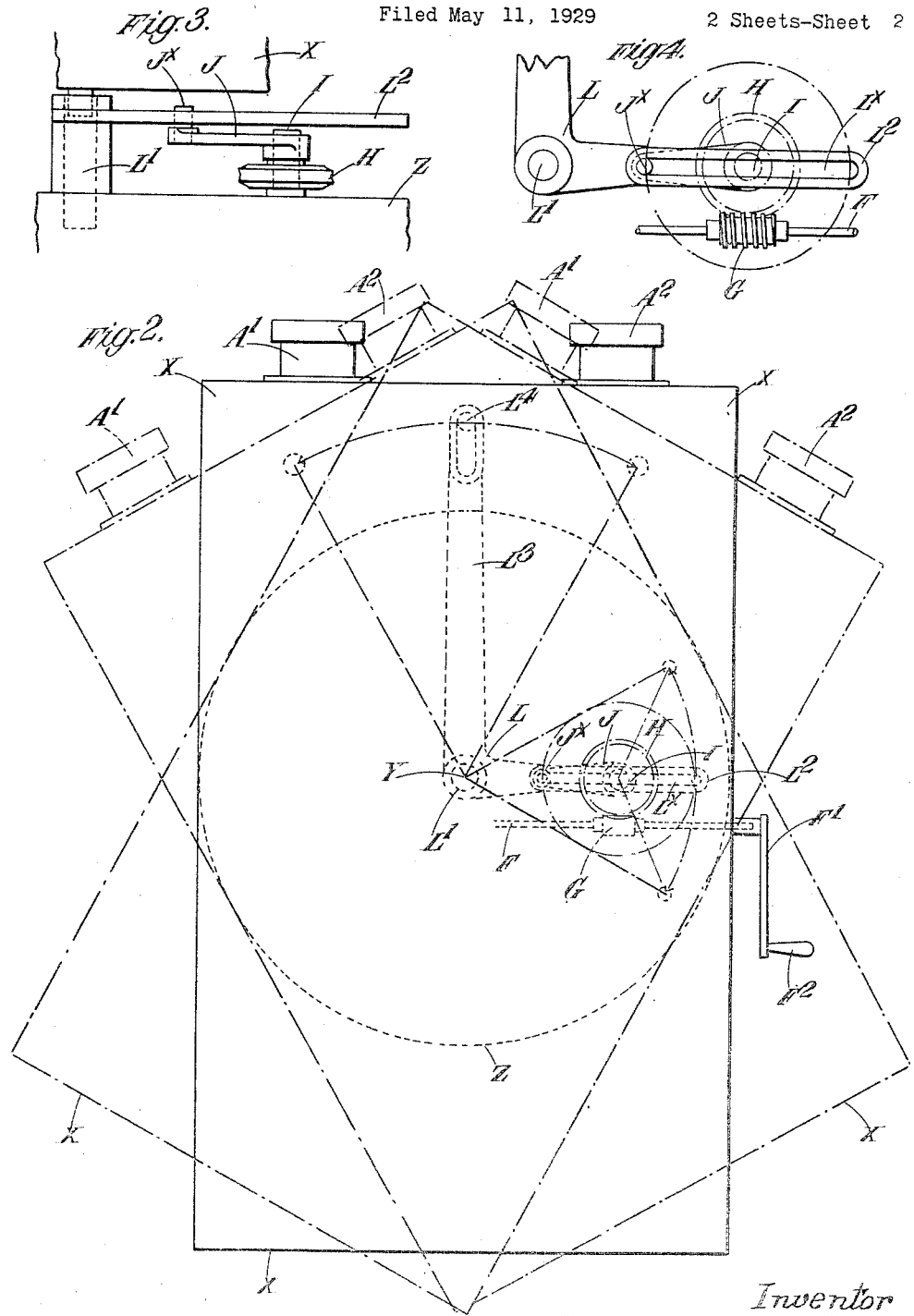

Patented May 16, 1933

1,909,222

UNITED STATES PATENT OFFICE

WILLIAM FOWLER PETTIE, OF LONDON, ENGLAND

PHOTOGRAPHIC CAMERA

Application filed May 11, 1929, Serial No. 362,401, and in Great Britain May 8, 1928.

An application Serial No. 13,511 has been filed by me in Great Britain on May 8th, 1928.

This invention relates to cinematography and refers to improvements in or relating to photographic cameras for this purpose; and primarily has for its object to obtain a stereoscopic or plastic effect.

My invention consists primarily of the application of two or more combined photographic lenses in the front wall of the camera spaced apart at a suitable distance (e. g. at or about the average interval separating the human eyes) and behind these two lenses a rotating shutter of a known kind or other suitable means (e. g. a separate shutter for each lens) is employed to normally close both lenses and so arranged as to alternately and separately open first one then the other lens and means are provided to transmit and direct the light rays coming through each lens in turn onto a common plane i. e. onto successive sections of a single film as same are moved into position in the camera ready for exposure.

Furthermore, I arrange and mount such a plurality of lenses (e. g. two lenses) so that a traversing motion may be imparted thereto through a small angle which traversing motion may be intermittent or continuous or other regulated motion for each lens.

The effect of plasticity is secured partly by the use of stereoscopically arranged lenses arranged to form an image alternately on successive sections of film and partly by the traversing motion of the lenses which results in each succeeding image being taken from a slightly different angle. Thus by combining these two devices an enhanced sense of relief is secured.

In conjunction with such plurality of lenses I employ any suitable shutter or means to open each lens alternately i. e. so that only one lens operates at a time for taking each picture in cinematography; for example I may employ a large circular disc as the shutter with a sector or aperture cut out of same to form an opening which will pass over each lens aperture in succession.

In carrying out my invention I may provide the camera with means to cause that part of the film where same is being exposed to assume a form curved transversely to the direction in which it travels between each exposure; and this curving of the film may advantageously be concave in imitation of or corresponding to the retina of the human eye i. e. with the concave surface towards the lens.

Such curvature of the film in partial imitation of the human retina will further increase the effect of solidity or plasticity in the resulting image.

In carrying my invention into practice in a cinematograph camera having two lenses, I arrange and mount each of the two lenses in suchwise that the desired traversing movement may be imparted by the ordinary crank shaft or other means whereby the film and film shutter etc. are usually operated in such camera e. g. by introducing any suitable mechanism between said shaft and the means for supporting said two lenses.

I will now proceed to further describe my present invention with reference to the accompanying drawings in which:—

Fig. 1 illustrates my invention as carried into practice with a pair of lenses located in the same horizontal plane and having a revolvable shutter arranged to normally close both lenses and when revolved thereby to alternately open each lens in succession and separately, the mechanism for imparting a traversing movement being omitted for clearness.

Fig. 2 is a top plan view of a cinematograph camera embodying my present invention and illustrating diagrammatically the relative positions to which the pair of lenses can be moved back and forth round the vertical axis.

Fig. 3 is a diagrammatic view on an enlarged scale of the mechanism for imparting reciprocatory movement to the camera carrying said pair of lenses; and Fig. 4 is a plan view of Fig. 3.

In the arrangement illustrated in Fig. 1;

$A^1$ $A^2$ are two combination photographic lenses mounted in the front wall of the camera and spaced apart from one another at or about the average distance separating the human eyes viz. 63 mm. from each centre of the lenses $A^1$ $A^2$.

B is a revolvable shutter of the usual type which normally cuts off the light of both lenses; but which, when revolved, is arranged to alternately open the lenses $A^1$ and $A^2$ in succession thereby to give exposure through only one lens at a time viz. first through the lens $A^1$ and next through the other said lens $A^2$, and so on.

$C^1$ is a double reflecting rhomboidal prism which converges the luminous rays—coming through the lens $A^1$—upon the section of film D in position in the camera for exposure; and $C^2$ is a corresponding prism which is arranged to converge the luminous rays—coming through the lens $A^2$—upon the next section of the film D in position in the camera for exposure; and so on.

In this invention only one film is used. Luminous rays from each objective being alternately transmitted through the respective double reflecting rhomboidal prisms $C^1$ or $C^2$ each of which converges the luminous ray bundles upon a successive section of the film D.

In Figure 1 of the drawings I have illustrated diagrammatically by the sprocket 10 a common means in use for curving and moving the film D. The film gate 11 is shown in section and positioned relative to the film.

Referring now to Fig. 2, the camera box or casing X is mounted to swivel or turn about a vertical axis Y supported on the camera stand or platform Z.

The camera box or casing X contains or comprises the usual or any suitable cinematographic roll film and the usual or any suitable means for operating said roll film step by step after each exposure; said camera box or case X also containing the double reflecting rhomboidal prisms such as $C^1$ $C^2$ (or their equivalent) and the revolvable shutter B, and carrying the two lenses $A^1$ $A^2$ as illustrated.

The mechanism for swinging this camera body X to and fro around the vertical axis Y so as to move same first in one direction and then in the opposite direction (e. g. into the respective positions indicated in dotted lines in Fig. 2) as illustrated in Figs. 2, 3 and 4 is as follows:—

$F^1$ is crank and $F^2$ handle thereon for revolving the crank shaft F in the usual manner for operating a cinematograph camera, whereby the film D is moved step by step in taking cinematographic pictures.

G is worm fixed rigidly on the crank shaft F.

This worm G gears with a worm wheel H fixed rigidly on the short shaft I which latter extends clear of the worm G; and on this short shaft I the crank J is rigidly fixed.

$J^x$ is a crank pin fixed on the crank J.

L is bell crank pivotally mounted at $L^1$. The arm $L^2$ of this bell crank L is provided with an elongate slot $L^x$ in which latter the crank pin $J^x$ is located and adapted to slide therein. The other arm $L^3$ of this bell crank L towards its outer end is pivotally connected at $L^4$ to the camera box or casing X.

It will thus readily be seen that when the crank shaft F is rotated, the worm G and worm wheel H on shaft I will revolve the crank J, and the crank pin $J^x$ travelling along the slot $L^x$ will rock the arm $L^2$ of the bell crank L about its axis $L^1$ and thereby the other arm $L^3$ of the bell crank will swing the camera X back and forth around the axis Y and thus impart the desired reciprocatory traversing motion to the camera while the series of cinematographic pictures are being taken—according to this invention—first through one lens and then through the other in succession whereby I obtain a succession of cinematographic pictures each taken from a different angle or view point.

Referring again to Figures 2, 3, and 4 it may be pointed out that these figures are not drawn to scale, and that normally the proportions of the parts of the camera transversing gear will be so arranged that the amplitude of the angle through which the camera is traversed back and forth is comparatively small, and in no case as large as the angle shown in Figure 2, which shows a large angle of traverse only for clearness.

What I claim is:—

1. A stereoscopic cinematograph camera employing a single film and including means of the known type for intermittently progressing said film between exposures, and comprising in combination two separate lenses horizontally spaced at a distance approximately equal to the average spacing of the human eyes, means co-operating with said lenses to focus the luminous rays from both lenses on the same part of the single film, shutter means co-operating with both lenses and arranged to produce successive exposures through each lens alternately, means whereby the camera is mounted to be rotatable about a vertical axis and means for traversing the camera through a small angle about said vertical axis with a regular reciprocating movement during the exposure of the film.

2. A cinematograph camera in accordance with claim 1, having a rotative shutter with a single aperture which is caused to pass across each lens in turn, and a pair of rhomboidal prisms each cooperating with one of the lenses so as to direct the rays therefrom onto the section of film to be exposed.

3. A cinematograph camera in accordance with claim 1 having traversing means comprising a worm on the main driving shaft, a worm wheel cooperating therewith and carrying an excentric stud, and a bell crank lever having slotted arms one of which is adapted to cooperate with the said excentric stud and the other arm with a stud fixed to the camera casing.

4. A cinematograph camera in accordance with claim 1, and having means adapted to cause that part of the film which is in position for exposure to assume a form curved transversely to the direction of travel thereof and concavely to the incident rays.

WILLIAM FOWLER PETTIE.